United States Patent [19]

Koob et al.

[11] 4,340,637

[45] Jul. 20, 1982

[54] TWO-COMPONENT MATERIAL

[75] Inventors: Friedrich Koob; Gusztav Lang, both of Munich, Fed. Rep. of Germany

[73] Assignee: Hilti Aktiengesellschaft, Schaan, Liechtenstein

[21] Appl. No.: 202,200

[22] Filed: Oct. 30, 1980

Related U.S. Application Data

[63] Continuation of Ser. No. 46,037, Jun. 6, 1979, abandoned.

[30] Foreign Application Priority Data

Jun. 14, 1978 [DE] Fed. Rep. of Germany ....... 2826109

[51] Int. Cl.$^3$ .......................... B32B 27/38; B32B 5/16
[52] U.S. Cl. .................................... 428/220; 106/291; 156/90; 428/323; 428/324; 428/325; 428/413; 428/480
[58] Field of Search ............... 428/215, 323, 324, 325, 428/328, 413, 480; 156/305, 90, 310; 260/37 EP; 106/291, 221, 813

[56] References Cited

U.S. PATENT DOCUMENTS

| 3,737,027 | 6/1973 | Ball | 206/219 |
|---|---|---|---|
| 3,837,981 | 9/1974 | Flint | 428/413 |
| 4,103,053 | 7/1978 | Barehas | 428/307 |
| 4,160,064 | 7/1979 | Nodiff | 428/40 |

Primary Examiner—Paul J. Thibodeau
Attorney, Agent, or Firm—Toren, McGeady & Stanger

[57] ABSTRACT

Two-component kneadable materials for gluing and coating which are composed of a hardenable component and a hardening agent wherein the two-components are separated by a thin layer of finely divided particulate material, the thin layer being destructible under working conditions.

8 Claims, No Drawings

TWO-COMPONENT MATERIAL

This is a continuation of application Ser. No. 046,037, filed June 6, 1979, now abandoned.

BACKGROUND OF THE INVENTION

1. Field of the Invention

The present invention relates to kneadable materials for gluing, sealing, filling, modeling, coating, doweling or bonding, consisting of a hardenable component and a hardener component or agent, namely, materials of the so-called two-component type.

2. Description of the Prior Art

Two-component materials consisting of hardeners and hardenable components are widely known and have significant industrial importance. The hardenable components which can be used are a wide variety of compounds, mostly organic compounds, such as, epoxides, unsaturated monomeric or polymeric esters, for example, acrylates, which harden after they have been mixed with a second component hardener, i.e., hardening agent. Depending on the type of the hardenable compound and the desired reaction, the hardeners which can be used are, for example, either true reaction partners, which become part of the reaction product, or also catalytically acting substances. For example, the hardeners which can be used are amines, including polyamines, amides, peroxides, including hydrogen peroxides and peracids, or unsaturated compounds, such as, styrene and the like.

The course of the reaction as well as the properties of the reaction products are significantly influenced not only by the type of the reaction components or catalysts, but also by the ratio of hardener and hardenable component in the mixture. Mixing errors may result in completely useless products. When too high a ratio of hardener and hardenable component is used, the danger of reduced potlife exists which can make it impossible to work the material; in the case of too small a ratio of hardener and hardenable component, there is the danger that the material will only partially or insufficiently harden so that inoperative products are formed.

These problems as well as the numerous attempts to overcome them are well known. For example, systems based on acrylates are known which contain special hardeners, namely, hydrogen peroxides, wherein hardening takes place with the exclusion of air or oxygen. Materials are also known which contain at least one of the two components in micro-encapsulated form, wherein the microcapsules are destroyed by appropriate measures at the time of use in order to start the hardening reaction. In all of these one-component systems which, accordingly, contain hardener and hardenable component pre-measured in the required mixture ratio, a certain reduction in the storage life must be expected.

Thus, to achieve a fully satisfactory storage life, the storing of the two reactive components separate from each other, e.g., in separate containers, cannot be avoided. Any contact results in a premature reaction which reduces the storage life. Attempts to overcome this problem, as by mixing aids, for example, coloring, dosing aids, and the like, did not work. Time and again, mixing errors with all the disadvantageous consequences resulted.

SUMMARY OF THE INVENTION

Accordingly, it is the task of the present invention to provide a two-component material which successfully counteracts any mixing errors. Another task is to provide two-component materials in which a separate storage is unnecessary without having to suffer a reduction in storage life in practice. Dosing aids, complicated mixing instructions, and the like, are to be made unnecessary.

We have discovered a composition which avoids the above-noted problems. More specifically, the composition of the present invention comprises a mixture of a hardenable and a hardener component wherein the components are separated by a thin layer of a fine particulate material which is destroyed under normal working conditions. Preferably, the fine particulate material has the structure of small plates, scales or laminae.

DESCRIPTION OF THE PREFERRED EMBODIMENT

More particularly, in accordance with the present invention, a thin layer of a finely divided particulate material is arranged between the two components of the present composition. The two components may have many shapes. For example, the two components may have the shape of rods of any chosen cross-section. These rods may be arranged either parallel next to each other or they may be helically or spirally twisted into each other. Further, it is also possible to arrange the components in layers in the manner of a laminate composed of at least two layers wherein the finely divided particulate material is arranged between the layers. It is also possible to give one component the shape of a hollow section and to arrange the second component within the thus formed hollow space with the intermediate arrangement of the layer of finely divided particulate material. It is also possible to arrange the two components as tape-like sections which are twisted into each other or as blocks whose side surfaces touch each other. As a result of this arrangement, weighing or other measures for adjusting the necessary mixture ratio are unnecessary.

Many inorganic and organic substances may be used as the finely divided particulate material so long as they can assume a finely divided shape. Particularly, the structure of the particulate materials is that of small plates, scales or laminae. Proven inorganic substances are, for example, plate-shaped metal powder of, for example, aluminum, copper, brass, steel, silver, etc. Also suitable are talcum, mica kaolinite, montmorillonite, vermiculite, various feldspars, molybdenum disulfide, graphite, glass flakes and the like. The organic materials which can be used are, for example, plates-shaped plastic powder, such as, polyester, polyethylene, epoxides and the like, and trazino chips, etc. Duroplastic material can also be used.

The fine particulate material preferably has an average particle size of 5 $\mu$m to 250 $\mu$m, and preferably, of 50 $\mu$m to 200 $\mu$m, wherein the predominant weight portion, and preferably at least about 70% by weight of the particles, is within the given particle size. More preferred is a finely divided particulate material in which the predominant portion has a particle size of 40 to 70 $\mu$m. Talcum with a bulk rate of 40 to 50 g per 100 ml, with a maximum particle size of 160 $\mu$m, can be used with excellent success.

The thin layer of the finely divided particulate material which is provided between the two components usually has a thickness of up to 50 μm, particularly up to about 30 μm. Layers of up to 10 μm are preferred. Generally, the layer thickness should not be less than 1 to 2 μm.

In using the material, it is sufficient to sever off a piece of the desired size, for example, from a rod of two longitudinal sections of the components which are spirally twisted into each other or from a laminate which is formed from the two components, and to subject this piece which contains the components in the correct mixture ratio to the conventional mixing procedure. It has been found particularly advantageous to make the two components of different colors, so that a uniform color of the mixture clearly shows that they are thoroughly mixed. In this case, the finely divided particulate material which, at first, is arranged between the two components can enter the two components as a filler.

In accordance with the invention, particularly proven two-component materials are those which contain expoxides as the hardenable component and amines or amides, particularly polyamides, as the hardener or hardening agent. Additional proven two-component materials are those which contain esters, particularly unsaturated monomeric esters or polyesters, for example, those wherein acrylates are the hardenable and peroxides or reactive comonomers, for example, styrene, are the hardener components. In this case, the esters may be preaccelerated, for example, by containing amines.

In most cases, at least one, but preferably both components contain fillers. This is particularly true for the hardener component. By means of these fillers, it is also possible to adjust the kneadable consistency of each component. The amount of filler in the hardenable component is frequently 50 to 80 percent by weight and preferably 65 to 75 percent by weight. The amount of filler in the hardener component is frequently higher, for example, in the range of 70 to 90 percent by weight, particularly 85 to 90 percent by weight.

A wide variety of materials of inorganic or organic origin can be used as fillers. These include mineral materials, such as, $SiO_2$, clays, microdolomite, slate, chalk, kaolin, heavy spar, gypsum, asbestos, and organic materials, such as, plastic powder and the like. Generally, the numerous conventional fillers can be used.

Furthermore, one or both components can contain conventional additives, such as, coloring pigments, softeners, antifoaming agents, agents for producing thixotropy (for example, highly dispensed silicic acid, organic castor oil derivatives), adhesion mediators (for example, aminosilanes).

Depending on the type and the amount of the components, the materials according to the invention can be used for various purposes. Two-component materials of epoxide/polyamine have been proven particularly effective as materials for doweling and filling. The invention shall be explained in the following with the aid of an example.

EXAMPLE

| Hardenable Component A | Hardener Component B |
| --- | --- |
| 40 parts epoxide resin (bisphenol type A or bisphenol type F) | 20 parts polyaminoamide (amine equivalent ~100) |
| EP value 185–195 | 2 parts polymercaptan (mercaptan No. 3.3) |
| 40 parts microdolomite | 40 parts microdolomite |
| 2 parts highly dispersed silicic acid | 20 parts heavy spar |
|  | 2 parts highly dispersed silicic acid |
| 16 parts talcum | 14 parts talcum |
| 2 parts coloring pigment | 2 parts coloring pigment |
| 100 parts | 100 parts |

For making the two-component material, each of the components is by itself mixed in a kneader or three-roll mill. The material can subsequently be transformed into the shape of rods by means of an extruder. The rods obtained in this manner or at least one of the rods, is then coated with the finely divided particulate material (talcum), for example, by means of rolling or sprinkling. The twisting into the shape of braids can be carried out on machines which are intended for the production of ropes.

What is claimed is:

1. In a two-component kneadable material for gluing, sealing, filling, coating or doweling of a hardenable component and a hardener component, the improvement consisting of said components being separated solely by a thin layer of a finely divided particulate material in the shape of small plates or scales, having an average particle size from about 5 μm to 250 μm, said thin layer being destructible under working conditions and acting as a filler in said final kneadable product.

2. The kneadable material of claim 1 wherein said finely divided particulate material has an average particle size of 50 μm to 200 μm.

3. The kneadable material of claim 1 wherein the finely divided particulate material has an average size of 5 μm to 250 μm and at least 70% by weight of the particles are within said particle size range.

4. The kneadable material of claim 1 wherein said thin layer has a thickness of up to about 50 μm.

5. The kneadable material of claim 1 wherein the thin layer has a thickness of up to about 30 μm.

6. The kneadable material of claim 1 wherein the thin layer has a thickness of up to about 10 μm.

7. The kneadable material of claim 1 wherein said finely divided particulate material is talcum, mica or glass flakes.

8. The kneadable material of claim 1 wherein said finely divided particulate material is of mineral origin.

* * * * *